(12) United States Patent
Kasahara

(10) Patent No.: US 6,612,642 B2
(45) Date of Patent: Sep. 2, 2003

(54) STRUCTURE AND METHOD FOR INSTALLING EXTERIOR PART

(75) Inventor: Hisao Kasahara, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,912

(22) Filed: Aug. 19, 2002

(65) Prior Publication Data
US 2003/0038507 A1 Feb. 27, 2003

(30) Foreign Application Priority Data
Aug. 21, 2001 (JP) ........................................ 2001-250481

(51) Int. Cl.[7] .................................................. B60J 1/20
(52) U.S. Cl. ........................ 296/180.1; 296/91; 296/1.1; 29/897.2
(58) Field of Search ............................ 296/180.1, 180.2, 296/180.4, 29, 91, 97.1, 97.9, 95.1, 1.1, 152, 154; 29/897.2

(56) References Cited

U.S. PATENT DOCUMENTS

| 4,323,274 A | * | 4/1982 | Soderberg et al. | ........ 296/180.1 |
| 4,652,036 A | * | 3/1987 | Okamoto et al. | ........ 296/180.1 |
| 5,360,253 A | * | 11/1994 | Sasaki et al. | ............ 296/180.1 |
| 6,293,613 B1 | * | 9/2001 | Choi | ....................... 296/180.1 |

* cited by examiner

Primary Examiner—D. Glenn Dayoan
Assistant Examiner—Jason Morrow
(74) Attorney, Agent, or Firm—McGinn & Gibb, PLLC

(57) ABSTRACT

A nut is buried previously in the inside of a roof spoiler to direct an axis center of its threaded hole to a working hole of an inner panel. A concave seat portion is formed on a surface of the roof spoiler on an outer panel side. A spacer is adhered to the concave seat portion. The spacer has a hole opened at the center portion thereof, and a bolt seat surface and an inclined surface on the outer panel side. The outer panel is deformed and fitted tightly to the spacer by fastening the bolt. A threaded portion of a bolt is inserted into a through hole formed in the outer panel and then screwed into the nut via the hole in the spacer.

10 Claims, 2 Drawing Sheets

STRUCTURE AND METHOD FOR INSTALLING EXTERIOR PART

BACKGROUND OF THE INVENTION

1. Field of the Invention

The present invention relates to a structure and method for installing an exterior part, and more particularly, the structure and method for installing the exterior part such as a roof spoiler to be attached to a vehicle body.

2. Description of the Related Art

In a related art, as one of exterior parts, a roof spoiler is attached to a roof panel or a rear gate panel of a vehicle in order to improve aerodynamic performance. As a roof spoiler installation structure, when the roof spoiler is attached to the rear gate panel consisting of an outer panel and an inner panel as one of a later-equipped part, for example, it is normal that concave seat surfaces are provided previously to the roof spoiler where nuts are fitted to concave seat surfaces and then bolts are respectively screwed into the nuts from the outer panel side to fasten to them. In this case, the concave seat surfaces to which the nuts of the roof spoiler are fitted are covered with caps, or the like.

Therefore, as shown in FIG. 3, in a situation that a stepped portion 23a, or the like is formed on an outer panel 23 of a rear gate panel 22, to which a roof spoiler is attached, as a mater of design of the vehicle, it is difficult to provide a hole, which is used to fasten a bolt 25 and a nut 26, because of the stepped portion 23a. Also, even if such a hole 28 can be provided on the outer panel 23 to avoid the stepped portion 23a slightly, it is difficult to execute fastening operation of the bolt 25 and the nut 26 which are provided vertically to the outer panel 23, through a working hole 27 which is provided previously in the inner panel 24 to pass harnesses therethrough, in the case that a working hole on the inner panel 24 is located apart from the hole 28 of the outer panel 23. As a result, the hole 28 used to fasten the bolt 25 and the nut 26 is provided at the position that is apart from the stepped portion 23a of the outer panel 23.

Accordingly, in the related art, a new working hole 29 is additionally provided to the inner panel 24 at a position that is opposed to the fastening hole 28. A fastening operation of the bolt 25 and the nut 26 is carried out via the new working hole 29.

However, in the above installation structure in which the fastening operation of the bolt 25 and the nut 26 is carried out through the new working hole 29, the operation of providing the new working hole 29 in the inner panel 24 is needed, and thus there is the problem such that the efficiency is deteriorated. Further, since the new working hole 29 is provided, there is another problem such that strength of the rear gate panel 22 is decreased. In addition, since the new working hole 29 must be provided apart from the existing working hole 27, the related art has the problem such that a fixing position of the roof spoiler 21 are also limited.

SUMMARY OF THE INVENTION

The present invention has been made in view of the above circumstances, and it is an object of the present invention to provide a structure and method for installing an exterior part in which the exterior part, particularly a roof spoiler, can be attached to a vehicle body not to occur the problem such as reduction in the body strength caused when a new working hole is provided.

In order to achieve the above object, an exterior part installation structure comprising:

an inner panel of a vehicle body having a multi-purpose working hole;

a deformable outer panel of the vehicle body having a through hole through which a bolt and a nut are fastened; and an exterior part attached to the outer panel by fastening the bolt into the nut so that the outer panel is deformed in such a manner that at least one of an axis center of the bolt (for example, an axis center of a threaded portion of the bolt) and an axis center of the nut (for example, an axis center of a threaded hole of the nut) is substantially directed to a center direction of the working hole.

In other words, in the above-mentioned exterior part installation structure, when the threaded portion of the bolt is inserted into a hole of the outer panel and then a fastening operation of the bolt and the nut is executed, the axis center of the threaded portion of the bolt and the axis center of the threaded hole of the nut are directed substantially to the center direction of the working hole. Therefore, the fastening operation of the bolt and the nut can be executed easily and effectively by inserting the tool such as a driver, or the like from the working hole. Also, since the axis center of the threaded portion of the bolt and the axis center of the threaded hole of the nut are directed substantially to the center direction of the working hole, it is not needed to provide additionally the new working hole.

Also, the exterior part installation structure preferably further comprises:

a spacer interposed between the outer panel and the exterior part, the spacer having a hole portion for guiding the threaded portion of the bolt to be screwed into the nut, and an inclined portion and a bolt seat surface which are formed on an outer panel side and form a surface along which the outer panel is deformed and adapted by fastening either the bolt or the nut to the spacer.

In other words, even when the nut is fixed to the exterior part, the threaded portion of the bolt being inserted from the outer panel side can be guided by the hole portion of the spacer and can be screwed smoothly into the nut. Also, the outer panel is deformed by fastening the bolt and the nut and is adapted along the inclined surface and the bolt seat surface of the spacer. Therefore, even if a character line exists in a vicinity of the fixing position of the exterior part on the outer panel, the exterior part and the outer panel can be jointed more tightly.

In addition, in the exterior part installation structure, it is preferable that either the bolt or the nut is fixed to the exterior part and the exterior part is formed by a blow molding so that either the bolt or the nut is buried previously in an inside of the exterior part when the exterior part is molded. Therefore, there is no necessity to cover the concave seat surface with the cap or the like, and thus the external appearance of the exterior part can be improved.

Further, in the exterior part installation structure, it is preferable that the exterior part is a roof spoiler installed on a rear gate panel at a rear portion of a vehicle body.

In addition, in the exterior part installation structure according to the present invention, it is advantageous that a portion of the inner panel around which the working hole is provided and a portion of the outer panel around which the through hole is provided extend substantially in parallel with each other before fastening the bolt and the nut, and wherein the portion of the outer panel is deformed after fastening the bolt and the nut.

Further, in the above-mentioned exterior part installation structure, the working hole of the inner panel may be located apart from a position below the through hole of the outer panel.

Moreover, the above-mentioned object can be achieved by a method for installing an exterior part to a vehicle body comprising the steps of:

aligning the exterior part to a deformable outer panel of the vehicle body having a through hole through which a bolt and a nut are fastened to secure the exterior part to the outer panel; and fastening the bolt and the nut and simultaneously deforming the outer panel so that at least one of an axis center of the bolt (for example, an axis center of a threaded portion of the bolt) and an axis center of the nut (for example, an axis center of a threaded hole of the nut) is substantially directed to a center direction of a multi-purpose working hole that is formed on an inner panel of a vehicle.

DETAILED DESCRIPTION OF THE PREFERRED EMBODIMENTS

Figure 1:
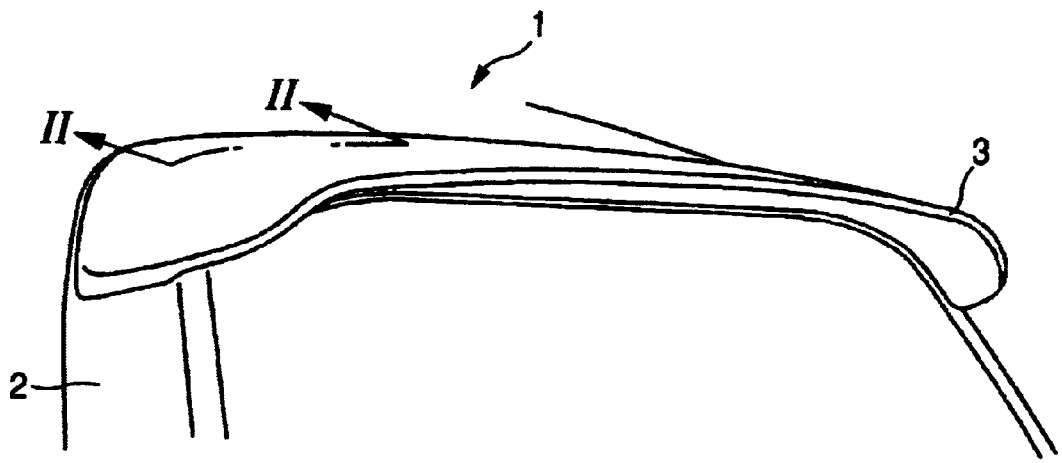
FIG. 1 is an explanatory view of a roof spoiler provided to a vehicle body.
Figure 2:
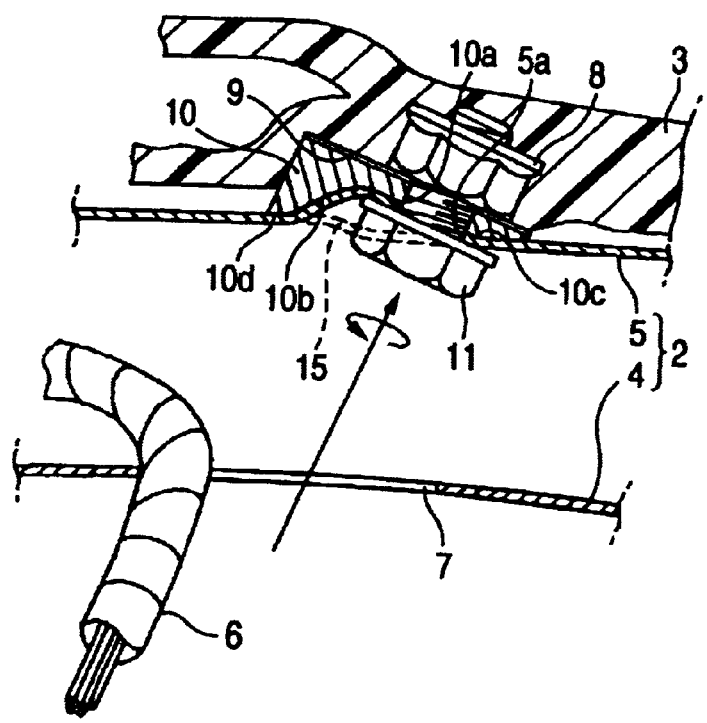
FIG. 2 is a sectional view taken along a II—II line in FIG. 1.
Figure 3:
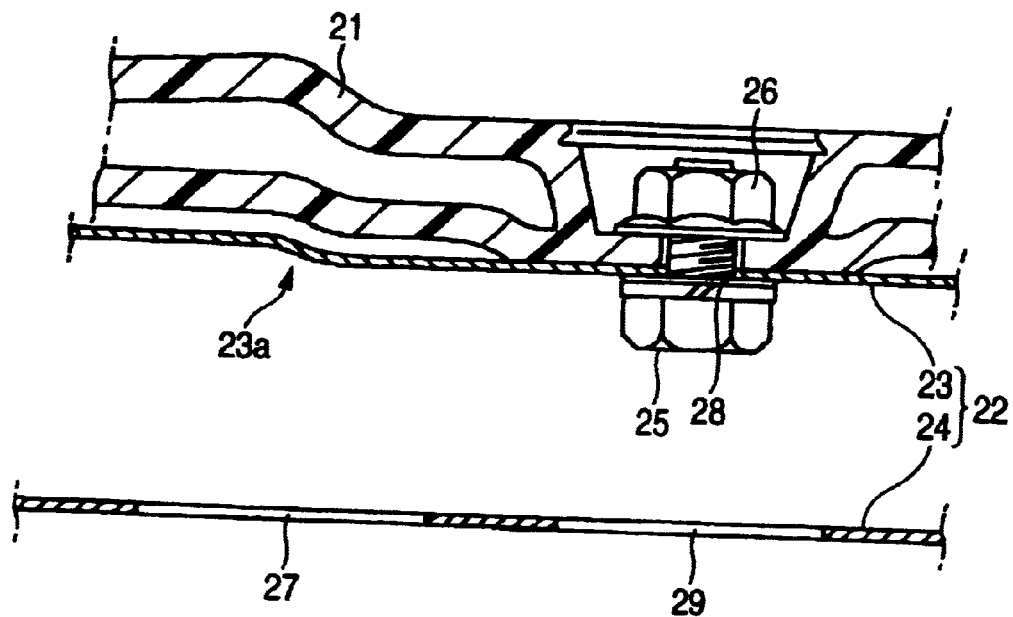
FIG. 3 is the explanatory view of a roof spoiler installation structure in the related art.

An embodiment of the present invention will be explained with reference to the drawings hereinafter. FIG. 1 and FIG. 2 are associated with the embodiment of the present invention. FIG. 1 is an explanatory view of a roof spoiler provided to a vehicle body, and FIG. 2 is a sectional view taken along a II—II line in FIG. 1.

In these Figures, a reference 1 denotes a vehicle body. A roof spoiler 3 which is used for an improvement of an aerodynamic performance is attached to a rear gate panel 2 of a rear portion of the vehicle body 1.

The rear gate panel 2 has a hollow structure consisting of an inner panel 4 and an outer panel 5. A harness 6 used to supply the electric power to a rear wiper, a license lamp, etc. (not shown) is inserted into the rear gate panel 2 via a working hole 7 that is formed previously in the inner panel 4.

The roof spoiler 3 is formed by such a blow molding as a nut 8 is buried previously in an inside of the roof spoiler 3 to direct an axis center of its threaded hole substantially to the center of the working hole 7. Then, a concave seat portion 9 is formed perpendicularly to the axis center of the threaded hole of the nut 8 on a surface portion of the roof spoiler 3 containing the nut 8 in the outer panel 5 side. The concave seat portion 9 has a square shape with a surface of the nut 8 as a bottom surface. A spacer 10 is adhered to the concave seat portion 9 by the double-coated adhesive tape, or the like.

The spacer 10 is formed to have a predetermined thickness. A hole portion 10a (not a threaded hole) through which the threaded hole of the nut 8 is exposed to the outer panel 5 is formed at the center of the spacer 10. Therefore, a threaded portion of a bolt 11 that is inserted from the outer panel 5 side can be easily guided to the threaded hole of the nut 8.

Also, a surface of the spacer 10 on the outer panel 5 side has a contact surface 10d, a bolt seat surface 10c, and an inclined surface 10b. The contact surface 10d comes into contact with the outer panel 5 on an outer periphery of the hole portion 10a. The bolt seat surface 10c is formed around the hole portion 10a perpendicularly to an axis center of the threaded portion of the bolt 11. The inclined surface 10b connects the contact surface 10d and the bolt seat surface 10c and is inclined gently to have a shape to which the outer panel 5 is adapted because of a deformation of the outer panel 5 caused when the bolt 11 is fastened to attach the roof spoiler 3.

A character line 15 (this reference indicates the shape of the outer panel prior to the deformation) is formed on the outer panel 5 to be opposed to the working hole 7 which is formed in the inner panel 4. A through hole 5a, through which the threaded portion of the bolt 11 is inserted to be screwed into the nut 8 via the hole portion 10a in the spacer 10, is formed on the outer panel 5 at the position that avoids the character line 15. The through hole 5a is formed from the surface side of the outer panel 5 by the drill, or the like. As a result, the center axis of the through hole 5a is deviated from the center axis of the working hole 7.

Next, procedures of attachment of the roof spoiler 3 will be explained hereunder.

First, the through holes 5a are formed in the outer panel 5 of the rear gate panel 2 from a top surface side of the outer panel 5 by using a tool such as a drill to avoid the character line 15 required as a matter of design, etc.

Then, the roof spoiler 3 is put on the outer panel 5 of the rear gate panel 2 such that the hole portion 10a of the spacer 10 is positioned almost over the through hole 5a that coincides with a fastening axis line.

Then, the threaded portion of the bolt 11 is inserted from the working hole 7 in the inner panel 4 via the through hole 5a in the outer panel 5 and the hole portion 10a of the spacer 10 and then screwed into the nut 8.

At this time, when the bolt 11 is fastened, the shape of the outer panel 5 containing the character line 15 is deformed from the original shape indicated by a reference dotted 15, so that the outer panel 5 is shaped to fit to the inclined surface 10b and the bolt seat surface 10c of the spacer 10 irrespective of the presence of the character line 15. Thus, the outer panel 5 can be fixed securely in such a state that the outer panel 5 can be brought into tight contact with the spacer 10.

In this manner, according to the present embodiment, the outer panel 5 of the rear gate panel 2 is deformed and tightly fixed to the spacer 10 by the inclined surface 10b and the bolt seat surface 10c of the spacer 10. Therefore, a fastening torque can be stabilized and thus the roof spoiler 3 can be attached to the outer panel 5 without fail.

Also, since the hole portion 10a of the spacer 10 acts as the guide when the threaded portion of the bolt 11 is guided to the nut 8, the operability in the fastening operation is good. Thus, even if the fastening operation of the bolt 11 and the nut 8 must be executed in the invisible situation, the threaded portion of the bolt 11 can be guided surely to the nut 8 and thus such disadvantages as a scoring (cocked condition) between the bolt 11 and the nut 8, etc. are not caused.

In addition, since the hole portion 10a of the spacer 10 acts to guide the threaded portion of the bolt 11 to the nut 8, the bolt with pilot, etc. is not needed. Therefore, a sectional thickness of the roof spoiler 3 can be reduced and also the margin of design freedom can be improved. In particular, because of a reduction in thickness of the roof spoiler 3, the clear external appearance and the fitting feeling to the vehicle body can be improved.

Also, even if the through hole 5a is provided at the position except for the stepped portion, the inclined surface, and the character line 15 of the outer panel 5 of the rear gate panel 2 that are placed to be opposed to the working hole 7 in the inner panel 4, there is no necessity that the new working hole should be provided and the existing working hole 7 can be utilized. Therefore, the reduction in the strength of the rear gate panel 2 can be prevented and also the margin in setting the fixing position of the roof spoiler 3 can be expanded.

Further, the nut 8 is buried in the inside of the roof spoiler 3 at the molding of the roof spoiler 3. Therefore, not only the reduction in the number of parts and the reduction in cost can be achieved since such parts as the cap, etc. are not needed, but also the roof spoiler 3 can be improved in design not to generate the line of the cap.

In the present embodiment, an example in which the nut 8 is buried in the roof spoiler 3 is explained, but the bolt may be buried in the roof spoiler 3. Also, the roof spoiler 3 in the present embodiment is explained for the structure in which spoiler is attached to the rear gate panel 2 as an example, but it is needless to say that the structure in which such a spoiler is attached to the roof panel can be implemented by the similar structure. In addition, the present embodiment may also be applied to the exterior part other than the roof spoiler, e.g., the side spoiler, etc.

As described above, according to the present invention, the exterior part can be attached to the vehicle body not to occur the problems such as the reduction in the body strength caused when the new working hole is provided, etc.

While there have been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the present invention.

What is claimed is:

1. An exterior part installation structure having an inner panel of a vehicle body with a multi-purpose working hole, comprising;
   a deformable outer panel of the vehicle body having a through hole through which a bolt and a nut are fastened; and
   an exterior part attached to the outer panel by fastening the bolt into the nut so that the outer panel is deformed in such a manner that at least one of an axis center of the bolt and an axis center of the nut is substantially directed to a center direction of the working hole.

2. The exterior part installation structure according to claim 1, further comprising:
   a spacer interposed between the outer panel and the exterior part, the spacer having a hole portion for guiding a threaded portion of the bolt to be screwed into the nut, and an inclined portion and a bolt seat surface formed on an outer panel side and forming a surface for the outer panel to be deformed and adapted by fastening either the bolt or the nut to the spacer.

3. The exterior part installation structure according to claim 1, wherein:
   either the bolt or the nut is fixed to the exterior part and the exterior part is formed by a blow molding so that either the bolt or the nut is buried previously in an inside of the exterior part when the exterior part is molded.

4. The exterior part installation structure according to claim 2, wherein:
   either the bolt or the nut is fixed to the exterior part and the exterior part is formed by a blow molding so that either the bolt or the nut is buried previously in an inside of the exterior part when the exterior part is molded.

5. The exterior part installation structure according to claim 1, wherein:
   the exterior part is a roof spoiler installed on a rear gate panel at a rear portion of the vehicle body.

6. The exterior part installation structure according to claim 1, wherein:
   a portion of the inner panel around the working hole and a portion of the outer panel around the through hole extend substantially in parallel with each other before fastening the bolt and the nut, and wherein the portion of the outer panel is deformed after fastening the bolt and the nut.

7. The exterior part installation structure according to claim 6, wherein:
   the working hole of the inner panel is located apart from a position below the through hole of the outer panel.

8. A method for installing an exterior part to a vehicle body comprising the steps of:
   aligning the exterior part to a deformable outer panel of the vehicle body having a through hole through which a bolt and a nut are to be fastened to secure the exterior part to the outer panel; and
   fastening the bolt and the nut and simultaneously deforming the outer panel so that at least one of an axis center of the bolt and an axis center of the nut is substantially directed to a center direction of a multi-purpose working hole formed on an inner panel of a vehicle.

9. The method according to claim 8, wherein:
   a portion of the inner panel around the working hole and a portion of the outer panel around the through hole extend substantially in parallel with each other.

10. The method according to claim 9, wherein:
    the working hole of the inner panel is located apart from a position below the through hole of the outer panel.

* * * * *